3,210,060
TAPPING COWPER
Aldo Ramacciotti, Genoa-Pegli, Italy, assignor to Società Finanziaria Siderurgica "Finsider" per Azioni Istituto Siderurguco, Genoa-Cornigliano, Italy
Filed Sept. 13, 1963, Ser. No. 308,909
Claims priority, application Italy, Jan. 18, 1963, 1,395/63
4 Claims. (Cl. 263—19)

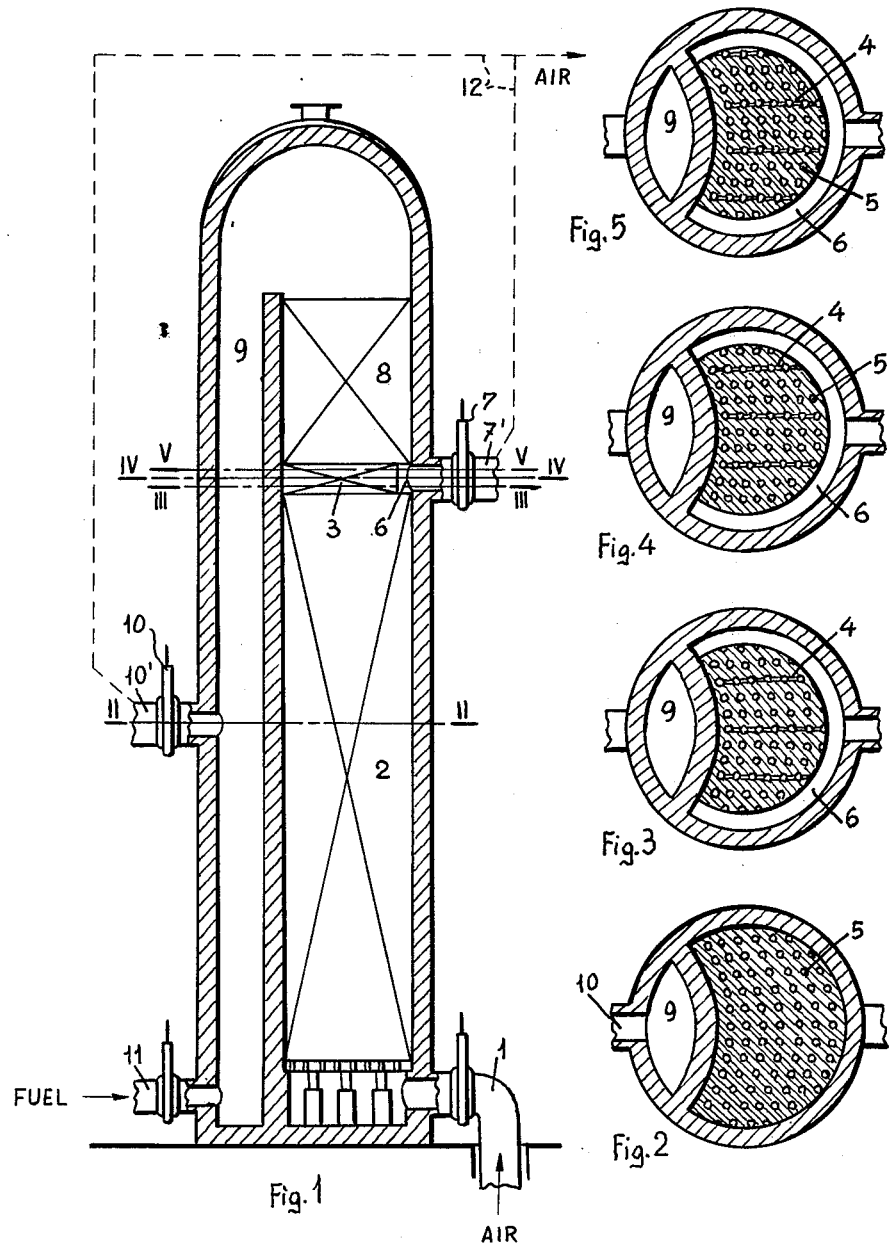

Devices called Cowpers having the function of heating the air for combustion or "wind" which is blown into a blast furnace, are well known.

Said devices work on the principle of heat exchangers, with alternate steps of heating "gas step" and cooling "wind step." During the gas step the Cowper stacking is heated by the gases produced in the annexed combustion chamber, while during the successive wind step the stacking is passed through by the wind which removes the heat remained in the stacking from the previous step and heats itself.

Usually the Cowpers are grouped in sets so as while one of them is in the wind step, another or others are in the gas step.

Owing to the way of operation of the Cowper, the temperature of the hot wind at the outlet of the Cowper itself is not constant. At the beginning of the wind step the temperature of the outgoing wind is higher, then little by little decreases together with the progressive cooling of the stacking.

As in a blast furnace there is need of a wind at constant temperature, at the outlet of the Cowper the hot wind is mixed with a suitable amount of cold wind so as to obtain the desired degree of temperature. Such operation makes the Cowper furnish a wind with a temperature always higher than the desired one, as the variation of the wind temperature by cold wind may be made only by cooling.

The improvement which is the object of the present invention allows a more convenient use of a Cowper which may be, with like output, of smaller size particularly as for the stacking.

The Cowper according to the present invention is first characterized in that it comprises a stacking divided into two zones, an upper one comprising about ⅓ of the weight of the stacking and a lower one comprising the remaining ⅔, and interposed between the two zones an annular conduit through which it is possible to tap part of the wind before it passes through the upper portion of the stacking.

The Cowper according to the present invention is further characterized in that correspondingly to the separation zone between the two groups in which the stacking may be considered as divided, it comprises transverse horizontal channels connecting the vertical bores of the stacking with an annular conduit connected to a tapping conduit with a valve, through which a part of the wind may be tapped, while the remaining wind passes through the upper stacking, heating up further, then through the combustion well and goes out another conduit with a valve.

The method according to the present invention is then characterized by that it is possible to tap a less hot wind from the said annular conduit and a hotter wind from the above last conduit, thus obtaining a wind at the desired temperature, by proportioning the two amounts of wind and mixing them downstream of the two above cited valves.

In the accompanying drawing, FIG. 1 shows diagrammatically a Cowper in vertical section, FIGS. 2 to 5 shows horizontal sections according to planes II—II; III—III; IV—IV and V—V respectively. The wind introduced in the Cowper in 1 after passing through the lower portion of the checkerwork stacking 2 arrives at zone 3 and here may be partly removed through the horizontal channel 4 connecting the vertical bores of stacking 5 to an annular conduit 6 and then may be tapped from the first tapping conduit by a valve 7.

The remaining wind passes through the upper stacking 8, heating up further, then down through the combustion well 9 and goes out the second tapping conduit 10' with a valve 10.

In other words, by the above mentioned improvement it is possible to tap a less hot wind from the first tapping conduit 7' and a hotter wind from the second tapping conduit 10'. By suitably proportioning the two amounts of wind and mixing them downstream of the two valves 7 and 10, through piping connections indicated schematically at 12, it is possible to obtain a mixed wind at the desired temperature without introducing any cold wind.

At the beginning, when the Cowper is still hot, the wind will be tapped mostly from conduit 7', afterwards with the progressive cooling thereof, valve 7 will be closed more and more and valve 10 opened more and more.

When valve 7 is completely closed and all the wind passes through conduit 10' and valve 10, it is the moment of reversing the operation and make the Cowper change to the heating step to heat it again.

Otherwise, the Cowper operates in the known way, particularly in the heating step, the heating of the Cowper takes place in the usual manner.

By the burner 11 hot gases are produced which, when the combustion within well 9 is over, passes through the whole stacking from the top downwards and goes out from the bottom through a conduit not shown in the drawing, but adjacent to the conduit denoted by 1.

The two valves 7 and 10 are closed in the heating step.

Although for describing reasons the present invention has been described and shown according to what above stated, many modifications and changes may be made in embodying the invention, all of them however being based on the main ideas of the invention.

What I claim is:

1. A tapping Cowper comprising a vertical cylindrical casing, a vertical wall dividing said casing into a combustion well and a stacking, said vertical wall terminating below the upper end of said cylinder to provide communication between said combustion well and stacking at the upper end of said cylinder, checkerwork having vertical bores therethrough in said stacking, a burner for producing hot combustion products in said well, means for discharging said combustion products from the lower portion of said stacking whereby said combustion products pass through and heat said checkerwork, means for introducing air to be heated at the lower portion of said stacking, means for discharging a first portion of said air at an intermediate location substantially below the top of said stacking and providing a first tapping conduit having a valve therein, means for discharging a second portion of said air from said combustion well and providing a second tapping conduit having a valve therein, whereby said first portion of air passes through a lower portion only of said checkerwork and is heated thereby while said second portion of air passes through the entire checkerwork and is heated to a higher temperature than said first portion of air, means connected to said first and second tapping conduits for mixing said first and second portions of discharged air and means delivering the resulting mixture, and means including said valves for selectively varying the proportions of said first and second portions of air to control the temperature of the mixture resulting from mixing said first and second portions of air.

2. A tapping Cowper according to claim 1, in which the portion of said checkerwork below said means for discharging said first portion of air comprises approximately two thirds of said checkerwork.

3. A tapping Cowper according to claim 2, in which said means for discharging said first portion of air comprises an annular passage extending partially around said stacking and a plurality of horizontal channels connecting said passage with said vertical bores in said checkerwork.

4. A method of obtaining air heated to a predetermined constant temperature which comprises passing hot combustion gases through a Cowper type heat exchanger to heat a stacking of checkerwork to a selected temperature, thereafter passing a first portion of air through a portion only of said heated stacking to heat said first portion of air to a temperature below said predetermined temperature, simultaneously passing a second portion of air through the entire stacking to heat said second portion of air to a temperature above said predetermined temperature, and mixing said heated first and second portions of air in selected proportions to produce a mixture having said predetermined temperature and progressively decreasing said first portion of air while progressively increasing said second portion of air, as said stacking progressively cools, to maintain said mixture constant at said predetermined temperature.

References Cited by the Examiner
UNITED STATES PATENTS

| | | | |
|---|---|---|---|
| 2,232,121 | 2/41 | Linder | 263—19 X |
| 3,082,995 | 12/60 | Krapf | 263—19 |
| 3,108,790 | 2/61 | Agarwal | 263—19 |

WILLIAM F. O'DEA, *Acting Primary Examiner.*

JOHN J. CAMBY, CHARLES SUKALO, *Examiners.*